United States Patent [19]

Kocsi et al.

[11] Patent Number: 4,912,607
[45] Date of Patent: Mar. 27, 1990

[54] VISOR EMERGENCY LIGHTING APPARATUS

[76] Inventors: Mark D. Kocsi, 120 Coventry Cir., Lansdale, Pa. 19446; Robert W. Kocsi, 200 New Hope St., Norristown, Pa. 19401

[21] Appl. No.: 339,220

[22] Filed: Apr. 17, 1989

[51] Int. Cl.⁴ .............................................. B60Q 1/46
[52] U.S. Cl. ..................................... 362/80.1; 362/74; 362/269; 340/472; 296/97.5
[58] Field of Search .................. 362/61, 74, 80.1, 135, 362/140, 142, 144, 269; 340/471, 472; 296/97.1, 97.5, 97.2, 97.6; 224/312

[56] References Cited

U.S. PATENT DOCUMENTS

| | | | |
|---|---|---|---|
| 1,674,340 | 6/1928 | Nock | 362/80 |
| 3,375,364 | 3/1968 | Marcus | 240/4.2 |
| 3,576,437 | 4/1971 | Peron | 362/61 |
| 3,754,810 | 8/1973 | Starczewski et al. | 296/97.5 |
| 4,174,864 | 11/1979 | Viertel et al. | 296/97 |
| 4,203,149 | 5/1980 | Viertel et al. | 362/144 |
| 4,486,819 | 12/1984 | Marcus et al. | 362/142 |
| 4,511,954 | 4/1985 | Marcus et al. | 362/275 |
| 4,740,872 | 4/1988 | Chou | 362/184 |
| 4,858,082 | 8/1989 | Hayuard | 362/74 |

FOREIGN PATENT DOCUMENTS 523597  4/1956  Canada ................................ 362/74

*Primary Examiner*—Ira S. Lazarus
*Assistant Examiner*—Richard R. Cole
*Attorney, Agent, or Firm*—Leon Gilden

[57] ABSTRACT

A vehicular visor emergency lighting apparatus includes a pivotally mounted visor including a visor member pivotally mounted to an elongate axle wherein a visor frame work slidably receives colored panels corresponding to emergency vehicle colorations within opposed planar sides of the visor framework. Positioned between the colored panels are a series of strobe lights and a sequencing member to effect sequencing of the lights to flash between respective pairs of the colored panels defining the exterior surfaces of the visor. A covering is slidably received over the visor to protect the panels during periods of non-use.

11 Claims, 1 Drawing Sheet

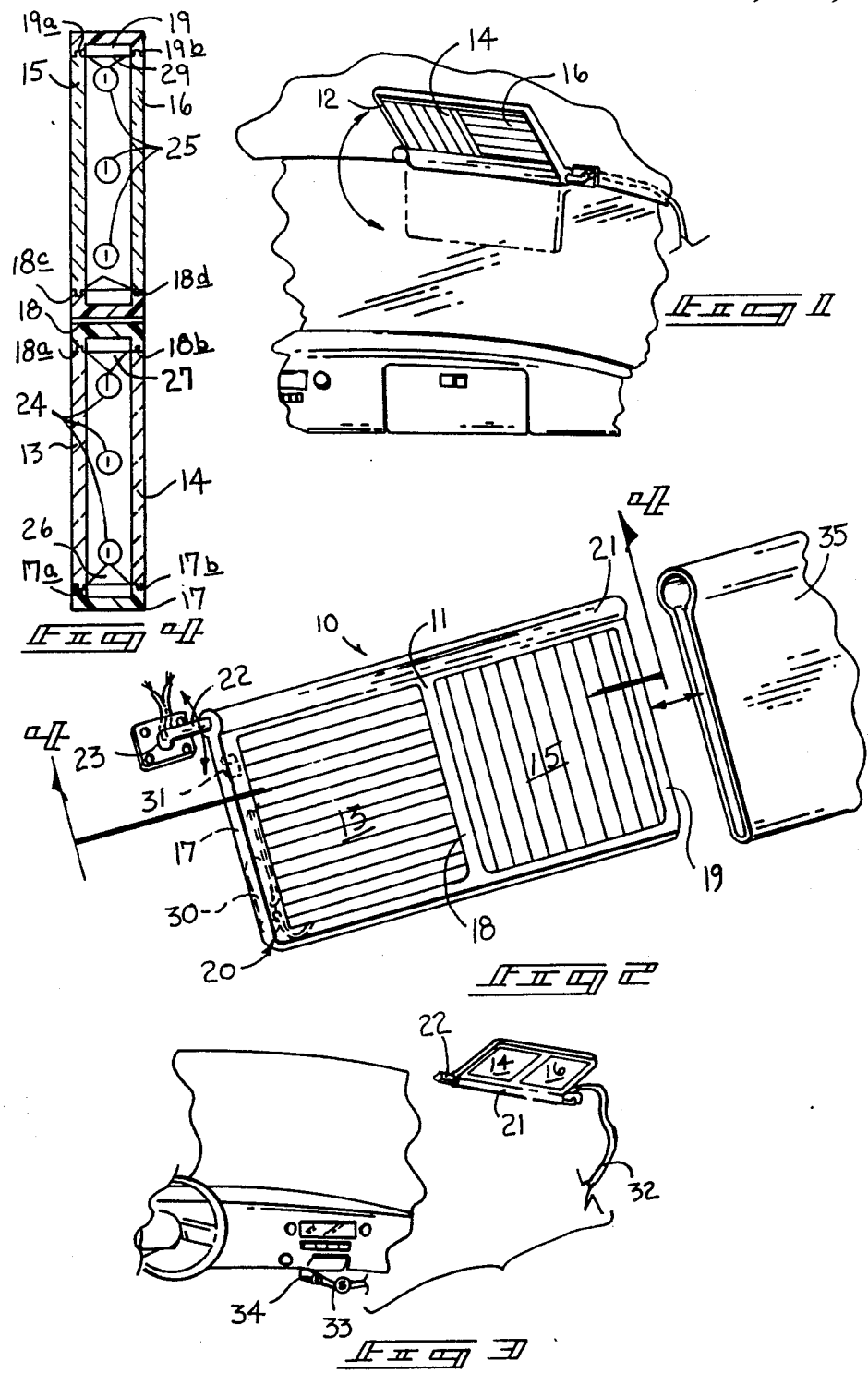

VISOR EMERGENCY LIGHTING APPARATUS

BACKGROUND OF THE INVENTION

1. Field of the Invention

Th field of invention relates to emergency lighting apparatus, and more particularly pertains to a new and improved visor emergency lighting apparatus wherein the same provides for a visor member to effect lighting through colored panels forwardly and rearwardly of the visor member to simulate emergency lighting conditions.

2. Description of the Prior Art

The use of illuminated visors has been set forth in the prior art wherein visors of the prior art have typically utilized vanity-type lighting and convenience lighting to accommodate a need for lighting interiorly of an automobile. The instant invention utilizes a visor emergency lighting arrangement to position the emergency lighting above a driver's immediate field of vision to minimize distraction by the emergency lighting during use. Examples of prior art visor lighting arrangements may be found in U.S. Pat. No. 4,611,954 setting forth a visor including a light member pivotally mounted within a compartment formed within the visor to provide a lighting arrangement that may be directed horizontally and Vertically of a forward face of the visor. The visor illuminating portion may be used in cooperation with a vanity mirror mounted within the same surface of the visor as the compartment housing the light.

U.S. Pat. No. 4,23,149 to Viertel, et al., sets forth a sun visor including a mirror provided with lighting members arranged at opposite sides of the mirror wherein the mirror is mounted between a plurality of pivot positions relative to the visor.

U.S. Pat. No. 4,486,819 to Marcus, et al., sets forth a panel provided with a mirror telescopingly received within a visor including a lighting member disposed about three sides of the mirror for enhanced usage of the mirror by an individual wherein the mirror is pivotally mounted relative to the visor once withdrawn from within the visor body.

U.S. Pat. No. 3,375,364 to Marcus sets forth a mirror member telescopingly received within a visor body non-pivotally mounted to the visor body when withdrawn from the visor body.

U.S. Pat. No. 4,174,864 to Viertel, et al., sets forth a vehicular sun visor with lighting members and a mirror disposed centrally of the visor body wherein lighting elements positioned about the mirror may be energized upon the opening of a covering overlying the mirror.

As such, it may be appreciated that there is a continuing need for a new and improved visor emergency lighting apparatus wherein the same is conveniently and compactly oriented relative to a driver of the vehicle and is further readily available for use when needed and as such, the instant invention substantially fulfills this need.

SUMMARY OF THE INVENTION

In view of the foregoing disadvantages inherent in the known types of illuminated visor devices now present in the prior art, the present invention provides a visor emergency lighting apparatus wherein the same may be compactly oriented in a conventional automotive sun visor position when not in use and may be further easily and efficiently energized and manipulated to effect optical illumination of emergency-type lighting. As such, the general purpose of the present invention, which will be described subsequently in greater detail, is to provide a new and improved visor emergency lighting apparatus which has all the advantages of the prior art visor illumination devices and none of the disadvantages.

To attain this, the present invention comprises an automotive sun visor formed with parallel planar upper and lower sides pivotally mounted to a support axle that itself is pivotally mounted to a pivot elbow to provide orientation of the visor forwardly and laterally of an associated vehicle. Replaceable colored panels are provided in pairs to be inserted within the upper and lower sides of the visor sandwiching a strobe lighting arrangement therebetween. The apparatus is actuated with a mercury switch upon the visor being pivoted to a vertical orientation. A protective covering sheath of a length coextensive and of complementary internal configuration to that of the visor is provided for protection of the lighting arrangement when not in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in &he art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved visor emergency lighting apparatus which has all the advantages of the prior art visor illumination devices and none of the disadvantages.

It is another object of the present invention to provide a new and improved visor emergency lighting apparatus which may be easily and efficiently manufactured and marketed.

It is a further object of the present invention to provide a new and improved visor emergency lighting apparatus which is of a durable and reliable construction.

An even further object of the present invention is to provide a new and improved visor emergency lighting apparatus which is susceptible of a low cost of manufacture with regard to both materials and labor, and which accordingly is then susceptible of low prices of sale to the consuming public, thereby making such visor emergency lighting apparatus economically available to the buying public.

Still yet another object of the present invention is to provide a new and improved visor emergency lighting apparatus which provides in the apparatuses and methods of the prior art some of the advantages thereof, while simultaneously overcoming some of the disadvantages normally associated therewith.

Still another object of the present invention is to provide a new and improved visor emergency lighting apparatus wherein the same provides for optical directing of emergency lighting upon pivoting of the visor to a vertical orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention positioned in a vehicle.

FIG. 2 is an isometric illustration of the instant invention in combination with an associated covering arrangement.

FIG. 3 is an isometric illustration of the instant invention electrically associated with a cigarette lighter of the associated automobile.

FIG. 4 is an orthographic view taken along the lines 4—4 of FIG. 2 in the direction indicated by the arrows.

DESCRIPTION OF THE PREFERRED EMBODIMENT

With reference now to the drawings, and in particular to FIGS. 1 to 4 thereof, a new and improved visor emergency lighting apparatus embodying the principles and concepts of the present invention and generally designated by the reference numeral 10 will be described.

More specifically, it will be noted that the visor emergency lighting apparatus 10 essentially comprises an "M" shaped frame 20 including a forward face 11 and a parallel spaced rear face 12. The forward face 11 and rear face 12 includes parallel spaced removable pairs of translucent colored panels conforming to emergency vehicles, such as a first top panel 13 overlying and parallel to a bottom first panel 14 that is typically of a red coloration spaced adjacent a top second panel 15 overlying and parallel to a bottom second panel 16 of a blue coloration conforming to emergency vehicles, such as police, etc. The panels are replaceably mounted within the "M" shaped frame by slidingly being positioned within the parallel first, second, and third respective legs 17, 18, and 19 wherein the first panels 13 and 14 are slidingly secured aligned with upper and lower surfaces of the first and second legs 17 and 18 with the second panels 15 and 16 slidingly secured and aligned with the upper surfaces of the second and third legs 18 and 19. The "M" shaped frame 20 includes a cylindrical housing 21 orthogonally formed relative to the first, second, and third legs 17, 18, and 19 respectively. The cylindrical housing 21 frictionally includes an elongate axle 22 extending outwardly of the cylindrical housing and directed into a pivot elbow 23 to enable the visor to be pivoted and arranged for visual observation forwardly and rearwardly, as well as laterally, of the vehicle.

With reference to FIG. 4, the first leg 17 includes a first groove 17a overlying a parallel to a second groove 17b directed towards the second leg 18 and more specifically, the first groove 17a aligned with a second leg first groove 18a in confronting relationship with the first legs second groove 17b aligned with and coextensive to a second leg second groove 18b. The respective first leg grooves and the second leg grooves slidingly received the respective top and bottom panels 13 and 14. The second leg includes a third groove and a fourth groove overlying and parallel one another and directed towards a third leg first groove 19a and a third leg second groove 19b wherein the grooves 19a and 19b are aligned with the respective grooves 18c and 18d respectively to slidingly receive the top and bottom second panels 15 and 16. Positioned within the "M" shaped housing 20 and medially aligned between the top and bottom first panels 13 and 14 are a first series of parallel strobe lights 24 with a second series of parallel strobe lights medially aligned within the "M" shaped housing between the top and bottom second panels 15 and 16. Positioned between the first leg first and second groove 17a and 17b is a first "V" shaped reflective panel 16 with an apex of the reflector aligned with the lights 24 with a second "V" shaped reflector panel 27 coextensive to the first reflector panel 26 and secured medially of the second leg first and second grooves 18a and 18b with its apex directed medially of and towards the first series of strobe lights 24. A third "V" shaped reflector panel is positioned medially of the second leg third and fourth grooves 18c and 18d with its apex directed towards and aligned with the second series of strobe lights 25 with a fourth "V" shaped reflector panel 29 aligned with the second lights 25 and coextensive with the third reflector panel and positioned between the third and fourth grooves of the second leg 18c and 18d. The reflector panels 26 through 29 are all coextensive with one another with their respective apex aligned and parallel to one another.

A mercury switch 30 positioned within the "M" shaped frame 20 is in a normally open position when the visor is in a horizontal orientation but is closed when the visor is pivoted downwardly to a generally vertical orientation to enable visual observation of the various panels 13 through 16 and the actuated strobe lights therebetween. The use of strobe lights is desirably utilized to enhance visual observation of the panels. Electrically associated with the strobe lights 24 and 25 respectively is a sequencer 81 to enable and effect sequencing of the strobe lights 24 and 25 alternately. A switch 38 is formed within the power core 32 as a further means of disabling the power directed to the visor with an adapter 34 utilized for temporary wiring of the visor apparatus, but it is understood that permanent wiring to the fuse panel of the associated automobile is available, as desired.

A cover 35 is selectively utilized and is formed with an interior configuration complementary to that of the visor which is normally frictionally covering the visor to protect the various panels and components therewithin and is readily removed therefrom, as illustrated in FIG. 2.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular visor lighting apparatus comprising,
   a visor body defined by a planar forward face spaced parallel to and aligned with with a planar rear face, and
   an elongate cylindrical housing coextensively formed to said visor body including an axle means rotatably mounted within said cylindrical housing for enabling rotation of said visor body from a first horizontal position to a second vertical position, and
   a first and second pair of spaced translucent panels, the first and second pairs of panels defined by a respective first top panel and a first bottom panel and a second top and a second bottom panel wherein the panels are mounted in parallel spaced relationship to one another within the visor body.

2. A vehicular visor lighting apparatus as set forth in claim 1 wherein each of the panels are slidably received within the visor body for selective replacement of the panels.

3. A vehicular visor lighting apparatus as set forth in claim 2 wherein the first pair of panels is of a first coloration and wherein the second pair of panels is of a second coloration.

4. A vehicular visor lighting apparatus as set forth in claim 3 further including a first series of lights aligned with one another and spaced medially of the first top panel and the first bottom panel within the visor body, and a second series of aligned lights spaced medially of the second top panel and the second bottom panel within the visor body, and power cord means for electrically communicating the first and second series of lights to electrical power source to provide selective illumination of the lights.

5. A vehicular visor lighting apparatus as set forth in claim 4 further including a mercury switch formed within the visor body and within the power cord to provide power to the first and second series of lights when the visor is in the second position, and to continue electrical power to the first and second series of lights when the visor body is in the first position.

6. A vehicular visor lighting apparatus as set forth in claim 5 wherein the visor body includes a first leg and a second leg spaced parallel to one another and slidingly receiving the first top panel and the first bottom panel, and the second leg and a third leg formed parallel to one another and slidingly receiving the second top panel and the second bottom panel, and the first leg, second leg, and third leg formed of equal length and spaced parallel to one another and orthogonally oriented relative to the cylindrical housing.

7. A vehicular visor lighting apparatus as set forth in claim 6 wherein a first "V" shaped reflector within its apex aligned with the first series of lights is formed within the visor body and secured to the first leg, and a second "V" shaped reflector body with its apex aligned with the first series of lights formed within the visor body and secured to the second leg, and a third "V" shaped reflector body formed within the visor body and mounted to the second leg in an opposed relationship to the second "V" shaped reflector body and formed with an apex aligned with the second series of lights, and a fourth "V" shaped reflector body formed with apex aligned with the second series of lights and mounted to the third leg, wherein the first reflector body, second reflector body, third reflector body, and fourth reflector body are each coextensively aligned and parallel to one another within the visor body.

8. A vehicular visor lighting apparatus as set forth in claim 7 further including a sequencing means electrically communicating with the first series of lights and the second series of lights to effect alternative illumination of the first series of lights and the second series of lights within the respective first pair of panels and the second pair of panels.

9. A vehicular visor lighting apparatus as set forth in claim 8 wherein the first, second, and third legs are formed with respective grooves to receive the respective panels slidingly therewith.

10. A vehicular visor lighting apparatus as set forth in claim 9 including a further switch to selectively de-energize the first and second series of lights mounted within the power cord remote from the visor body.

11. A vehicular visor lighting apparatus as set forth in claim 10 further including a cover slidably mounted over said visor body to afford protection of the visor body and formed with an internal configuration complementary to that of the external configuration of the visor body.

* * * * *